United States Patent [19]

Fujishiro et al.

[11] Patent Number: 5,458,970
[45] Date of Patent: Oct. 17, 1995

[54] SHAPED-ARTICLES MADE OF FIBERS FOR USE IN PRODUCING FIBER-REINFORCED COMPOSITE MEMBERS

[75] Inventors: Hideyuki Fujishiro; Tatsuya Suzuki; Tsugio Ohba, all of Saitama, Japan

[73] Assignee: Honda Giken Kogyo Kabushiki Kaisha, Tokyo, Japan

[21] Appl. No.: 320,188

[22] Filed: Oct. 7, 1994

Related U.S. Application Data

[63] Continuation of Ser. No. 967,154, Oct. 27, 1992, abandoned.

[30] Foreign Application Priority Data

Oct. 29, 1991 [JP] Japan .................................. 3-283299
Oct. 29, 1991 [JP] Japan .................................. 3-283300
Oct. 29, 1991 [JP] Japan .................................. 3-283301

[51] Int. Cl.$^6$ ..................................................... D02G 3/00
[52] U.S. Cl. ........................... 428/370; 428/359; 501/89; 501/92; 501/95; 264/45.1
[58] Field of Search ......................... 428/359, 370, 428/372; 501/89, 92, 96, 95; 264/45.1, 45.3, 42

[56] References Cited

U.S. PATENT DOCUMENTS

| | | | |
|---|---|---|---|
| 4,973,503 | 11/1990 | Hotchkiss | 428/36.4 |
| 5,082,597 | 1/1992 | Tashiro et al. | 252/516 |
| 5,096,858 | 3/1992 | Chaklader et al. | 501/89 |
| 5,098,871 | 3/1992 | Ray | 501/95 |
| 5,108,963 | 4/1992 | Fu et al. | 501/89 |
| 5,108,964 | 4/1992 | Corbett et al. | 501/89 |
| 5,120,681 | 6/1992 | Cameron | 501/89 |
| 5,132,178 | 7/1992 | Chyung et al. | 428/372 |
| 5,153,057 | 10/1992 | Corbett et al. | 428/283 |

*Primary Examiner*—N. Edwards
*Attorney, Agent, or Firm*—Lyon & Lyon

[57] ABSTRACT

A shaped-article for use in producing a fiber-reinforced composite member is formed of short fibers and deformed fibers. The deformed fibers have a plurality of needle-like portions extending from a nucleus portion. The short fibers are orientated at random by dispersing the deformed fibers. The fiber shaped-article is formed by pouring a slurry of the short fibers and deformed fibers dispensed in a liquid into a mold, compressing the slurry and removing the liquid.

6 Claims, 14 Drawing Sheets

1

SHAPED-ARTICLES MADE OF FIBERS FOR USE IN PRODUCING FIBER-REINFORCED COMPOSITE MEMBERS

This is a continuation of application Ser. No. 07/967,154 filed on Oct. 27, 1992, now abandoned.

BACKGROUND OF THE INVENTION

1. Field of the Invention

The field of the present invention is shaped-articles made of fibers for use in producing fiber-reinforced composite members, and methods for producing the same.

2. Description of the Prior Art

There are conventionally known fiber shaped-articles of such a type formed of short fibers such as whiskers. In general, such a shaped-article is formed by a producing process comprising the steps of pouring into a forming mold a slurry-like forming material comprising short fibers dispersed in liquid, removing the liquid and, at the same time, accumulating the short fibers.

In the conventional shaped-article, however, the short fibers have a specific orientation with their lengthwise direction being substantially perpendicular to an accumulating direction. For this reason, in a fiber-reinforced composite member made therefrom, an anisotropy is provided in characteristics thereof, resulting in a problem that such a fiber-reinforced composite member is unsuitable for application to a structural member to which a multi-axial stress is applied, such as a functional member including slide portions slidable in different directions and the like. In addition, the conventional fiber shaped-article tends to be of a small thickness and to increase in density, due to the producing process therefor, resulting in a problem that it is impossible to meet the needs for increasing the thickness and reducing the density.

The conventional producing process also is accompanied by a problem that the accumulated mass is liable to increase in density, as the liquid is removed. For this reason, gaps for drainage between the short fibers in the accumulated mass are reduced, thereby requiring a lot of time for removing the liquid, resulting in an inferior productivity of the fiber shaped-article.

A hybrid type shaped-article is employed in order to provide the fiber-reinforced composite member with various characteristics, for example, both strength and wear resistance. In this instance, the reinforcing fibers may be different in specific gravity in many cases due to the difference between their compositions. If the conventional producing process is utilized in order to produce a fiber shaped-article of such a type, reinforcing fibers having a high specific gravity are sedimented faster than reinforcing fibers having a low specific gravity, resulting in a hybrid type shaped-article comprised essentially of two layers: a portion formed of the reinforcing fibers of high specific gravity and a portion formed of the reinforcing fibers of low specific gravity, and, therefore, it is impossible to produce a hybrid type shaped-article with reinforcing fibers of a high specific gravity being dispersed uniformly therein.

SUMMARY OF THE INVENTION

It is an object of the present invention to provide a shaped-article of the type described above, wherein a fiber-reinforced composite member with a moderate anisotropy in characteristics thereof can be produced therefrom, and it is possible to meet the needs for an increase in thickness and a reduction in density.

To achieve the above object, according to the present invention, there is provided a shaped-article made of fibers for use in producing a fiber-reinforced composite member, comprising short fibers and deformed fibers having a plurality of needle-like portions extending from a nucleus portion, the short fibers being orientated at random by dispersing the deformed fibers.

With the above configuration, the specific orientation of the short fibers is broken by the deformed fibers and, therefore, it is possible to provide a shaped-article with short fibers orientated at random, thereby producing a fiber-reinforced composite member with a moderate anisotropy in characteristics thereof. In addition, crowding of the short fibers is prevented by the deformed fibers, and therefore, it is possible to provide a shaped-article having an increased thickness and a low density.

It is another object of the present invention to provide a producing process of the type described above, wherein the time for removing the liquid can be shortened to provide an improved productivity of a shaped-article, and yet have the short fibers orientate at random.

To achieve the above object, according to the present invention, there is provided a process for producing a shaped-article made of fibers for use in producing a fiber-reinforced composite member, comprising the steps of pouring a slurry-like forming material into a forming mold, the slurry-like forming material comprising a fiber mixture dispersed in liquid, the fiber mixture being comprised of short fibers and deformed fibers having a plurality of needle-like portions extending from a nucleus portion, removing the liquid in the slurry-like forming material and, at the same time, accumulating a fiber mixture, thereby providing a shaped-article with the short fibers orientated at random.

With the above producing process, during the accumulation of the fiber mixture, the crowding of the short fibers is prevented by the deformed fibers, so that the accumulated mass is maintained at a low density. Therefore, it is possible to ensure a large number of gaps for drainage between the short fibers within the accumulated mass, thereby shortening the liquid-removal time to provide an improved productivity of the fiber shaped-article. In addition, the specific orientation of the short fiber is broken by the deformed fibers and, hence, the short fibers orientate at random in the fiber shaped-article.

It is a further object of the present invention to provide a producing process of the type described above, which is capable of producing a hybrid type shaped-article with reinforcing fibers of a high specific gravity being dispersed uniformly therein. To achieve this object, according to the present invention, a fiber mixture of short fibers and deformed fibers having a specific gravity set larger than that of short fibers is used in a producing process of the type described above.

With the above producing process, during the accumulation of the fiber mixture, the deformed fibers of the higher specific gravity are sedimented in a manner to hold the short fibers of the lower specific gravity therearound by their needle-like portions, and, therefore, it is possible to produce a hybrid type shaped-article with the deformed fibers dispersed uniformly therein.

The above and other objects, features and advantages of the invention will become apparent from a consideration of the following description of the preferred embodiments, taken in conjunction with the accompanying drawings.

DESCRIPTION OF THE PREFERRED EMBODIMENTS

Example 1

Figure 1:
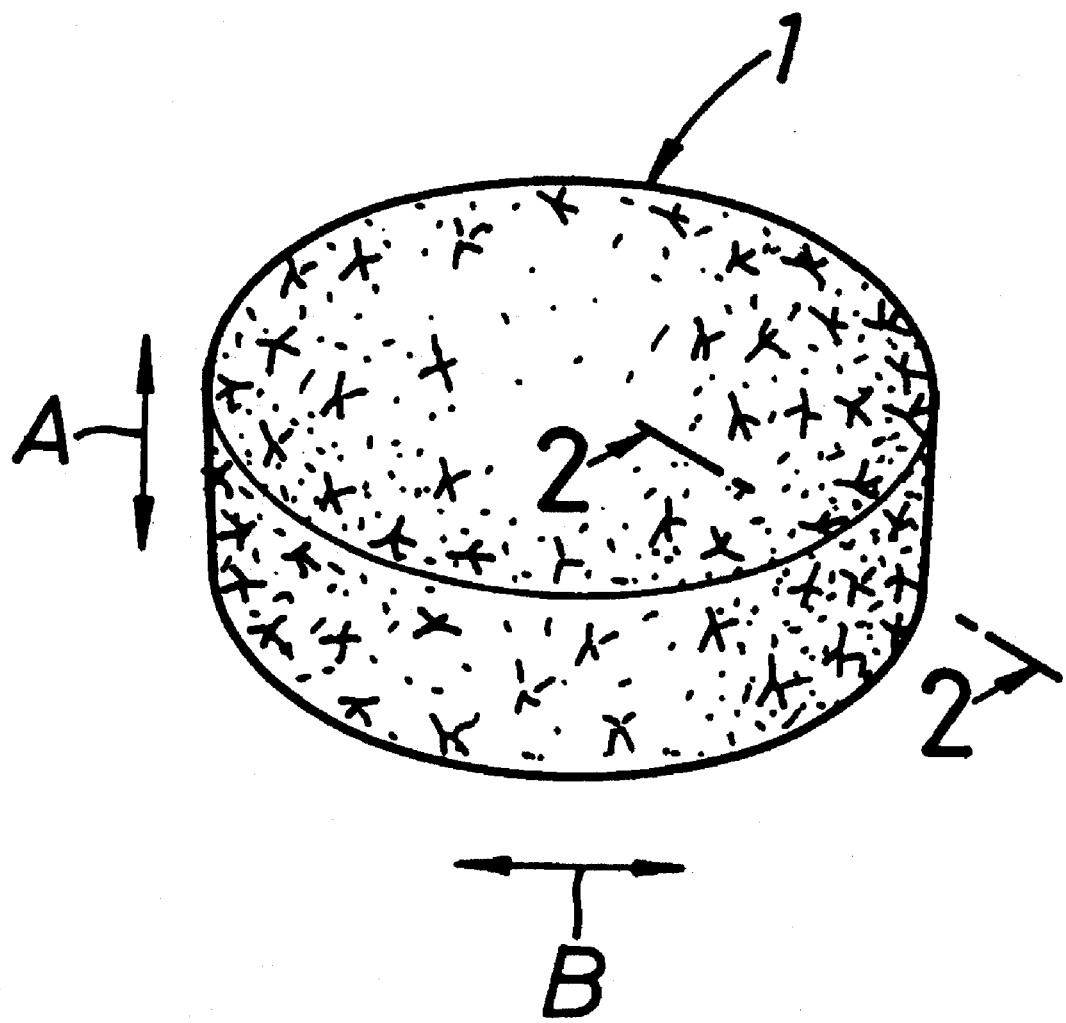
FIG. 1 is a perspective view of a shaped-article.
Figure 2:
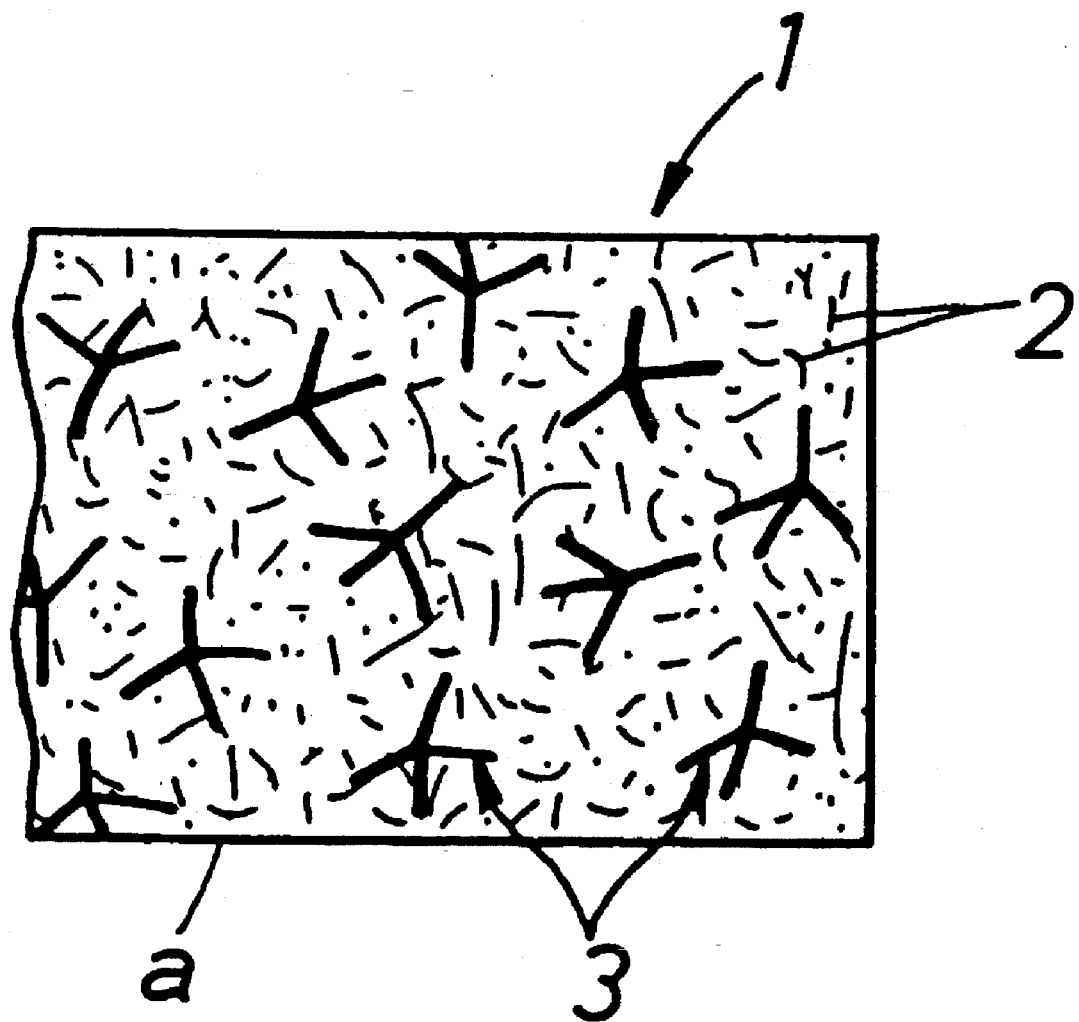
FIG. 2 is a sectional view taken along a line 2—2 in FIG. 1.

FIGS. 1 and 2 illustrate a preferred embodiment of a shaped-article 1 for a fiber-reinforced composite member. The shaped-article 1 is formed into a substantially disk-like configuration and is comprised of short fibers 2 and deformed fibers 3.

Figure 3A:
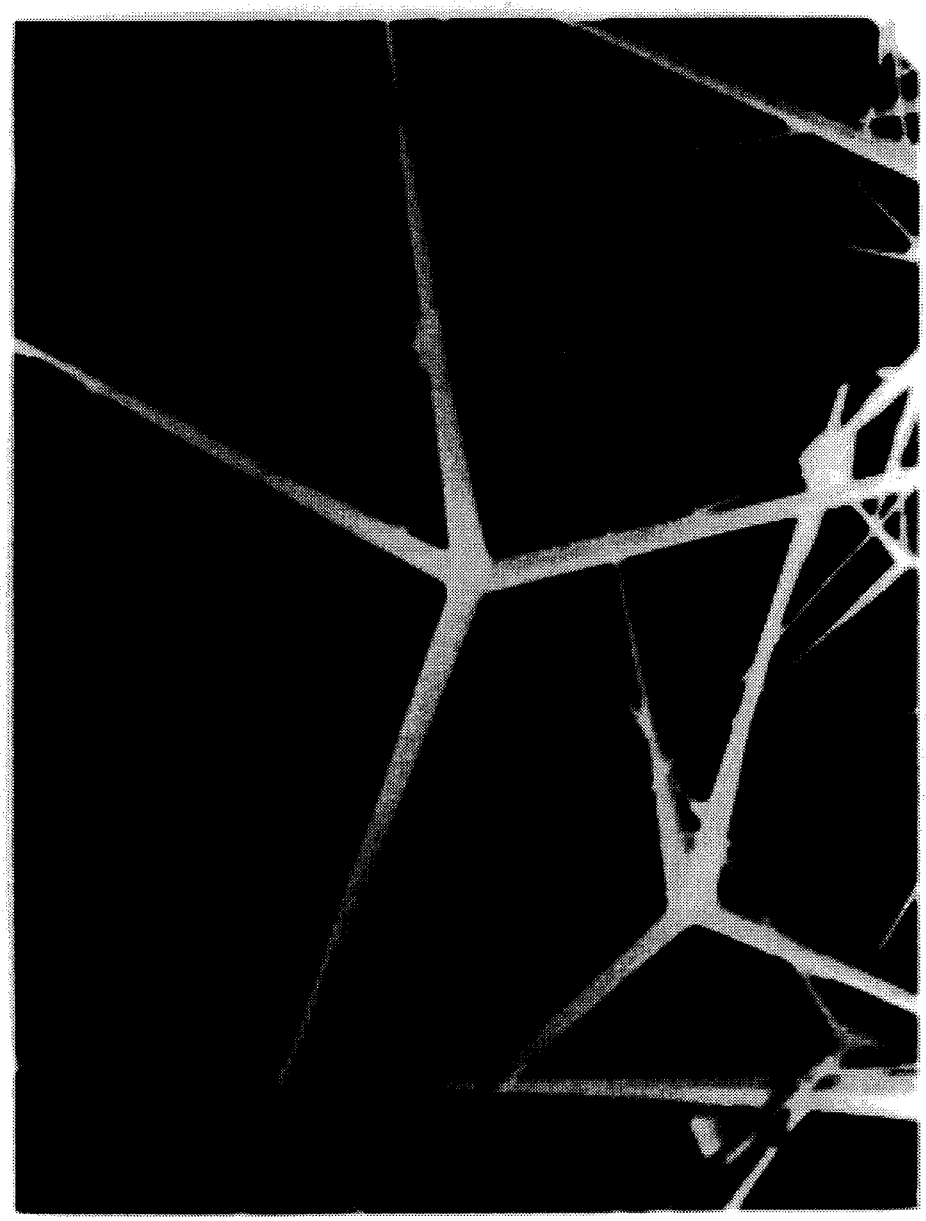
FIG. 3A is a microphotograph (700 magnifications) of deformed fibers.
Figure 3B:
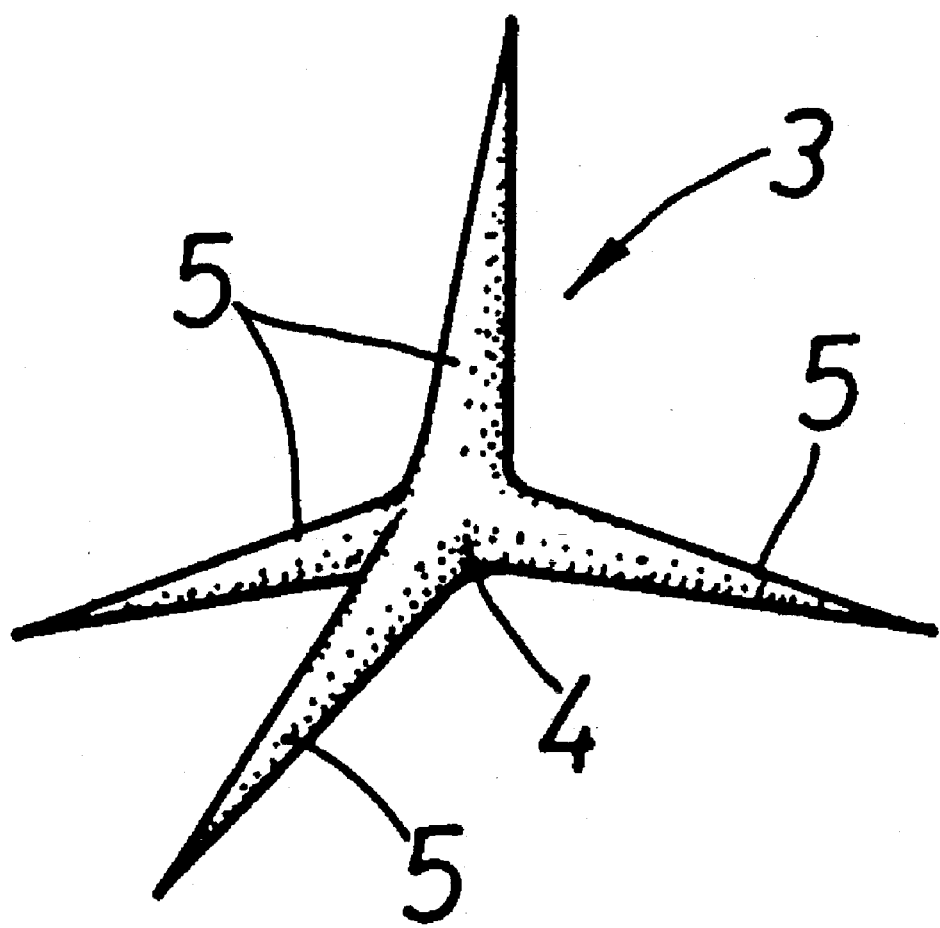
FIG. 3B is a perspective view of the deformed fiber.

The short fiber 2 used is a silicon carbide whisker (SiC whisker) having a relation of L/D> 1, wherein L represents the length and D represents the diameter, i.e., the whisker has a predetermined length longer than its diameter. The length of the silicon carbide whisker is in the range of 20 to 60 μm, and the diameter D is in the range of 0.3 to 0.6 μm. The deformed fiber 3 used is a zinc oxide whisker (ZnO whisker) having a plurality of needle-like portions 5 extending from a nucleus portion 4, e.g., of a tetrapod shape with four needle-like portions 5 in the illustrated embodiment, as clearly shown in FIGS. 3A and 3B. The length of the needle-like portion 5 from the nucleus portion 4 in the zinc oxide whisker is in the range of 10 to 100 μm.

In the shaped-article 1, the deformed fibers 3 are uniformly dispersed in the entire shaped-article 1, and the short fibers 2 orientate at random.

A method for producing the shaped-article 1 will be described below.

Figure 4:
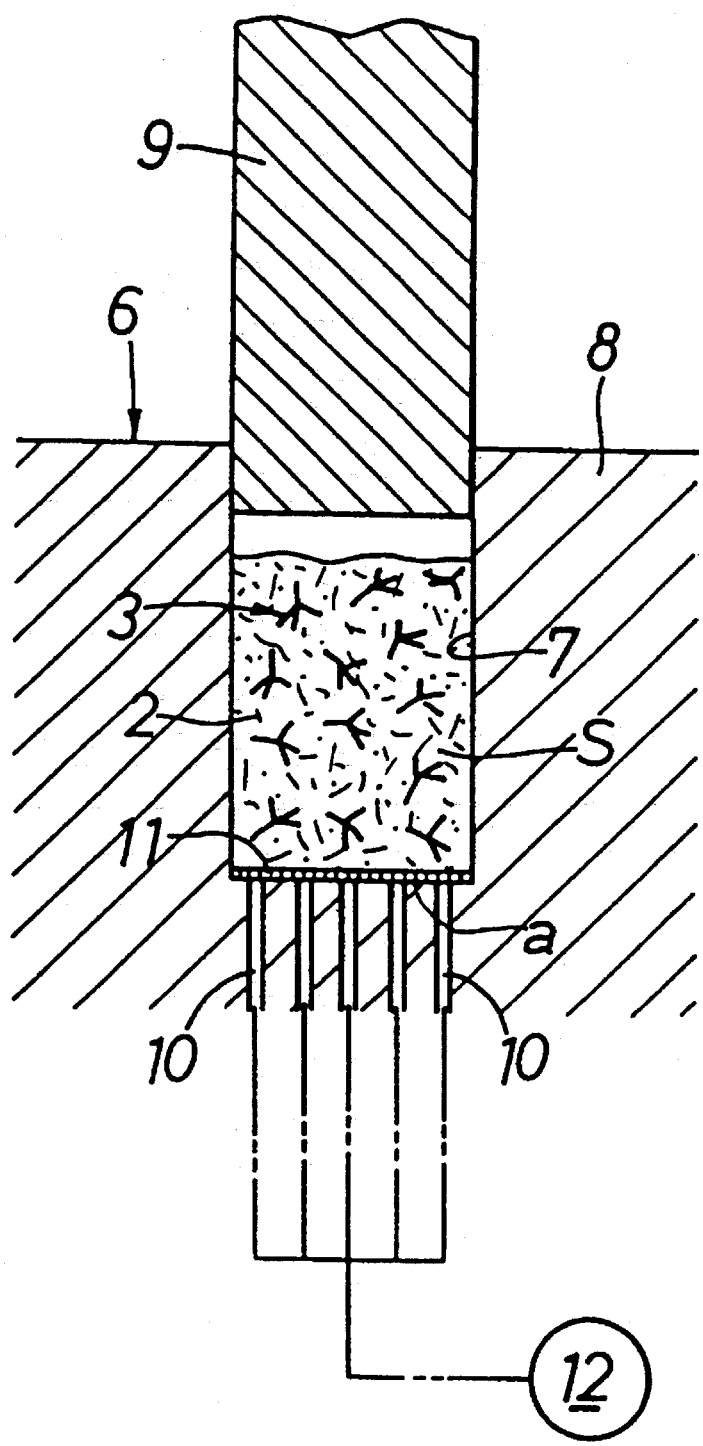
FIG. 4 is a sectional elevation view for illustrating a condition in which a slurry-like forming material has been poured into a forming mold.

FIG. 4 illustrates a mold 6 used for producing the shaped-article 1. The mold 6 is comprised of a mold body 8 having a cavity open at the top, and a press piston 9 slidably received into the cavity 7. A plurality of drainage holes 10 are opened in a bottom of the cavity in the mold body 8. Entrances of the drainage holes 10 are covered with a filter 11, while exits of the drainage holes 10 are connected to a suction pump 12.

First, a fiber mixture comprising the shorts fibers 2 and the deformed fibers 3 is dispersed in liquid, e.g., water in this producing example, to prepare a slurry-like forming material.

Then, a predetermined amount of the slurry-like forming material S is poured into the cavity 7, as shown in FIG. 4.

Figure 5:
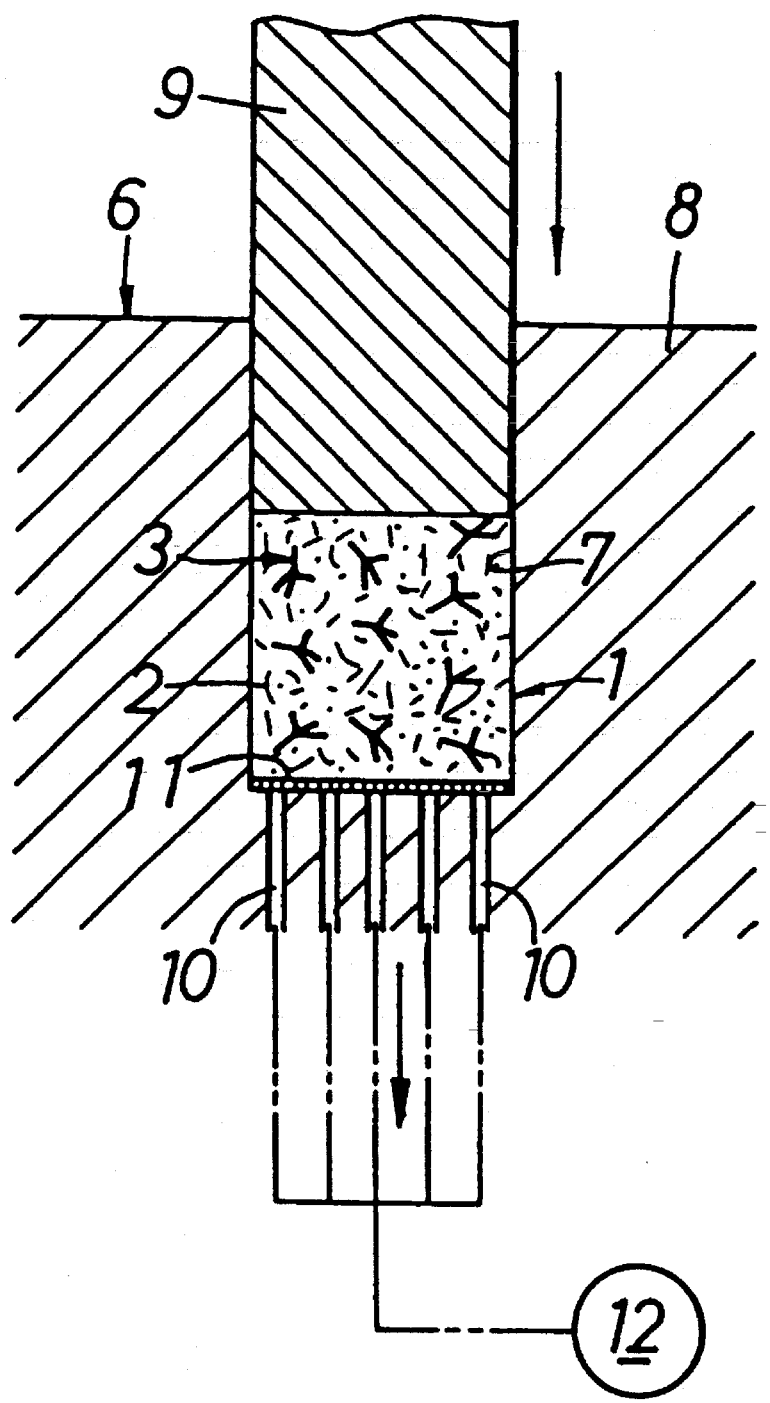
FIG. 5 is a sectional elevation view for illustrating a condition in which the shaped-article is being formed.

Subsequently, the suction pump 12 is operated while the press piston 9 is lowered, as shown in FIG. 5, thereby removing the liquid and accumulating the fiber mixture, thus producing the shaped-article 1.

During this accumulation of the fiber mixture, the deformed fibers 3 are sedimented while holding the short fibers 2 therearound and, therefore, the specific orientation of the short fibers 2 is broken In addition, the crowding of the short fibers 2 is prevented by each of the needle-like portions 5 of the deformed fibers 3 and, therefore, the accumulated mass is maintained at a low density.

The shaped-article 1 that is produced through the above-described steps achieves the desired orientation of the short fibers at random, uniform dispersion of the deformed fibers 3, increase in thickness and reduction in density.

The conditions for producing the shaped-article 1 in accordance with this invention are as follows:

The size of the shaped-article: the diameter being 86 mm and the length being 25 mm;

The slurry-like forming material: water being in the amount of 1,000 cc, the fiber mixture being in the amount of 97 g, and the amount of deformed fibers 3 incorporated being 5% by volume;

The pressing force of the press piston: 100 kg/cm$^2$; and

The suction pressure of the suction pump: 10 Torr.

The amount of deformed fibers 3 incorporated (% by volume) is represented by $(V_2/V_1) \times 100$, wherein $V_1$ represents the total volume of the fiber mixture (i.e., the sum of the volumes of the short fibers 2 and the deformed fibers 3), and $V_2$ represents the volume of the deformed fibers 3.

The deformed fibers 3, in some cases, may be folded at the needle-like portion 5 during handling and the like, but such a deformed fiber 3 still has an effect of breaking the specific orientation of the short fibers and the like, if it has at least two needle-like portions 5. Such effect is improved as the number of needle-like portions 5 is increased.

Figure 6:
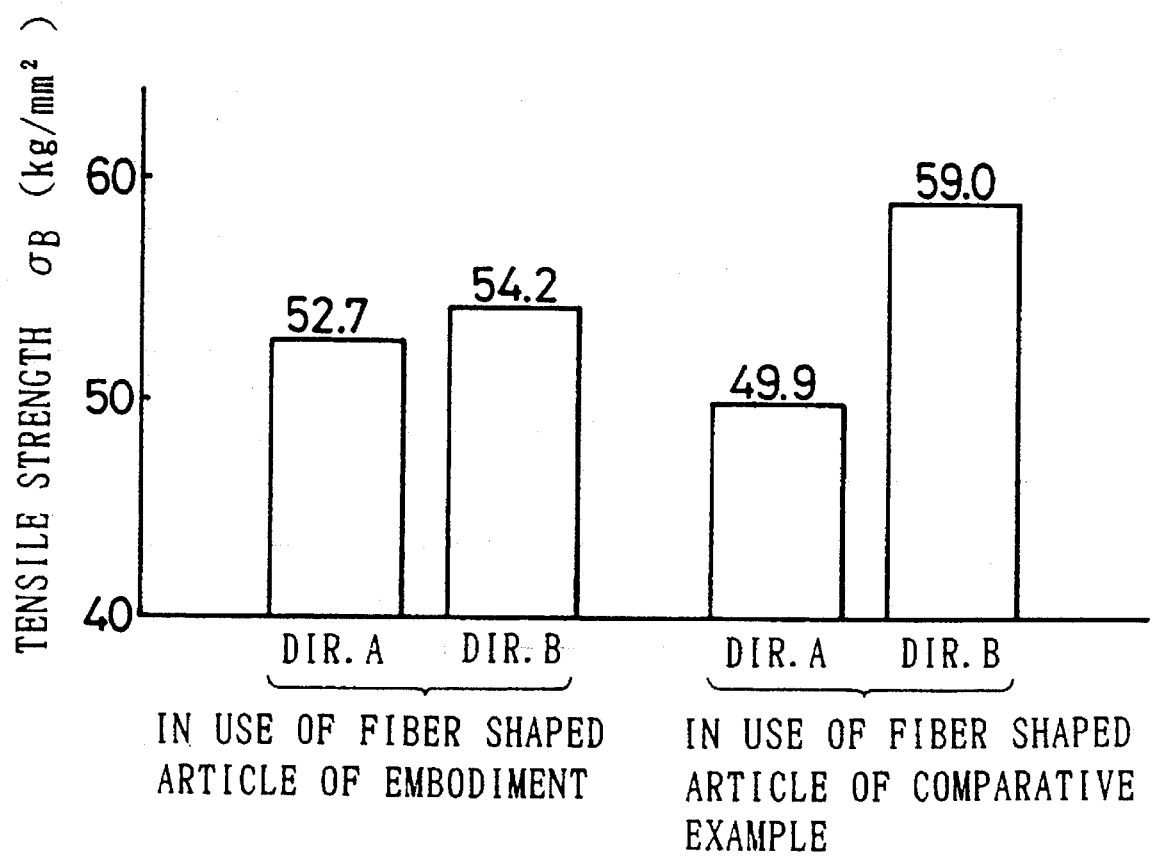
FIG. 6 is a graph illustrating the tensile strengths of fiber-reinforced composite members produced using the shaped-article according to the embodiment of the present invention and produced using a shaped-article of a comparative example, respectively.

FIG. 6 illustrates the comparison of the tensile strength of a fiber-reinforced composite member produced using the shaped-article according to the embodiment of the present invention with that of a fiber-reinforced composite member produced using a shaped-article of a comparative example made in the same manner with the same materials except the deformed fibers 3 were omitted. In FIG. 6, the direction A indicates a direction parallel to a direction of accumulation, as shown in FIG. 1, and the direction B indicates a direction perpendicular to the direction of accumulation, i.e., the direction B, as shown in FIG. 1.

The shaped-article 1 of the embodiment is comprised of zinc oxide whiskers as the deformed fibers 3 blended in the amount of 5% by volume with the silicon carbide whiskers as the short fibers 2. The silicon carbide whiskers orientate at random. The volume fraction Vf of the shaped-article in the fiber-reinforced composite member is of 20%.

The shaped-article of the comparative example is formed of only the silicon carbide whiskers. The volume fraction Vf of this fiber shaped-article in the fiber-reinforced composite member is of 20%, and the silicon carbide whiskers have an orientation with the lengthwise direction substantially perpendicular to the direction A.

An Al-Si-Cu-Mg based alloy was used as a matrix forming material, and in producing the composite member, a molten metal forging process was utilized.

As apparent from FIG. 6, in the fiber-reinforced composite member produced using the shaped-article 1 of the embodiment, the difference in strength between the directions A and B is small, which means that a moderate anisotropy is provided in characteristics, as compared with those in the fiber-reinforced composite member produced using the shaped-article of the comparative example. This is due to the fact that the silicon carbide whiskers orientate at random.

Figure 7:
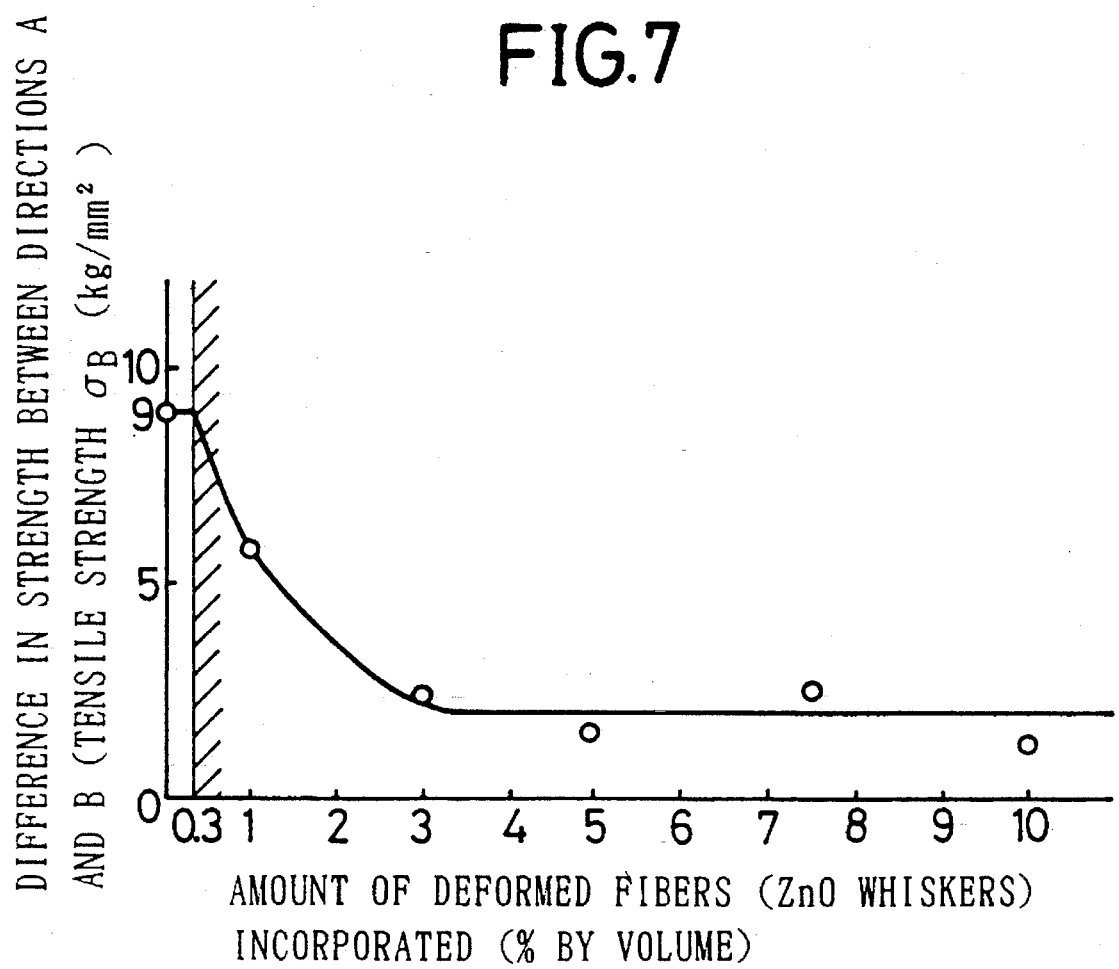
FIG. 7 is a graph illustrating the relationship between the amount of deformed fibers incorporated and the difference in strength between directions A and B for the fiber-reinforced composite member.
Figure 8:
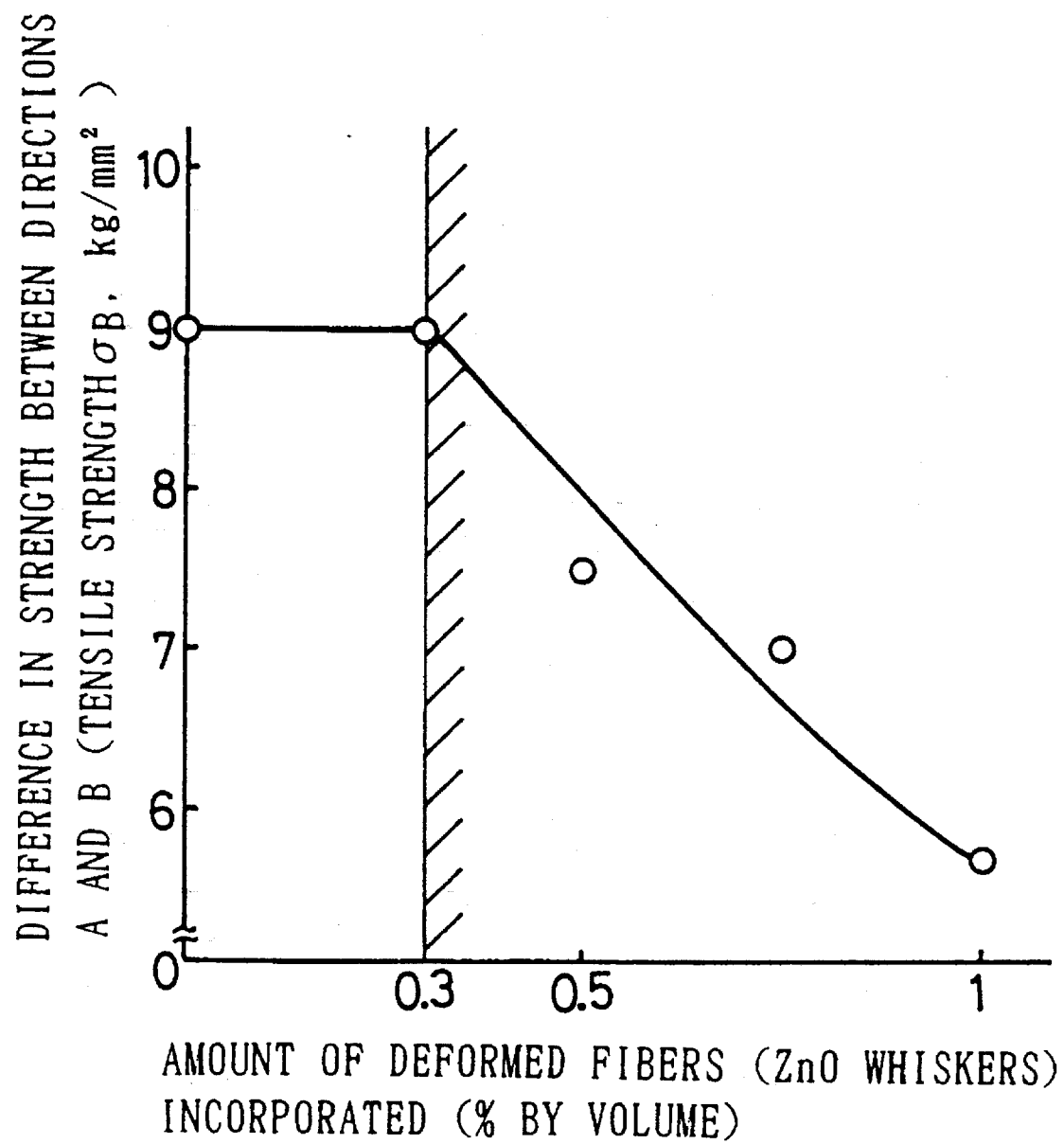
FIG. 8 shows an essential portion of the graph shown in FIG. 7, in an enlarged scale.

FIG. 7 illustrates the relationship between the amount of deformed fibers 3 incorporated and the difference in strength between the directions A and B, and FIG. 8 shows the essential portion of FIG. 7 in an enlarged scale. It can be seen from FIGS. 7 and 8 that the difference in strength between the directions A and B can be reduced by setting the amount of deformed fibers 3 incorporated at least at about 0.3% by volume. The preferred amount of deformed fibers 3 incorporated for providing such an effect is at least about 3% by weight.

Figure 9:
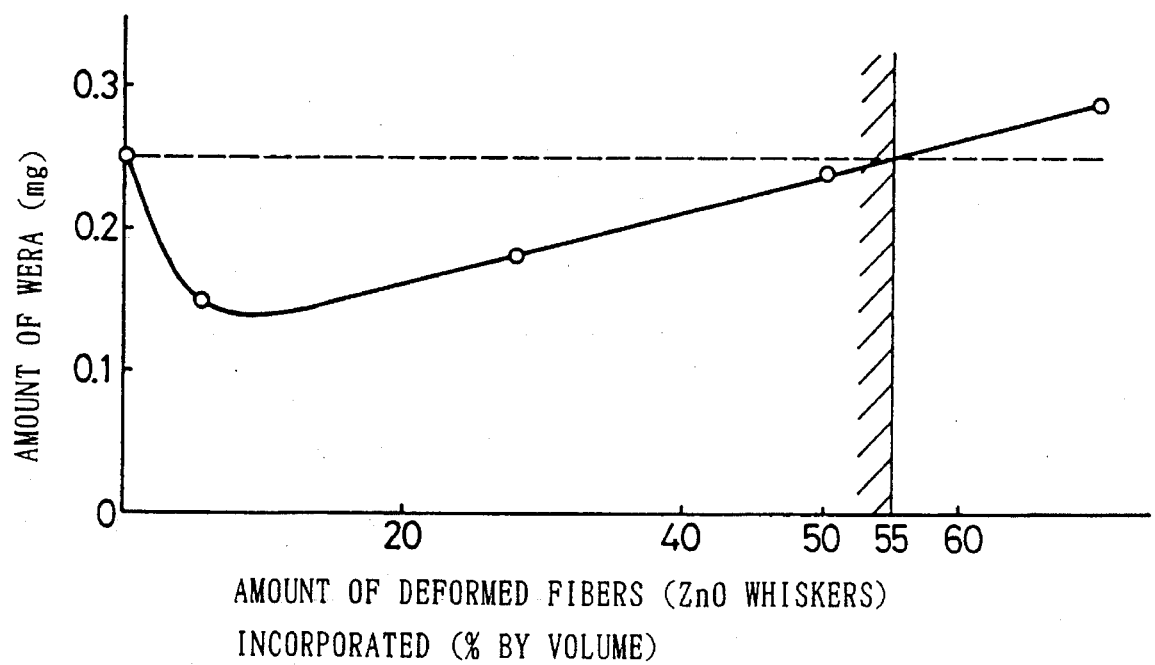
FIG. 9 is a graph illustrating the relationship between the amount of deformed fibers incorporated and the amount of wear.

FIG. 9 illustrates the relationship between the amount of deformed fibers 3 and the amount of wear. It can be seen from FIG. 9 that the wear resistance of the composite member is enhanced by the incorporation of the deformed fibers 3, but an upper limit of the incorporation is about 55% by volume.

Figure 10:
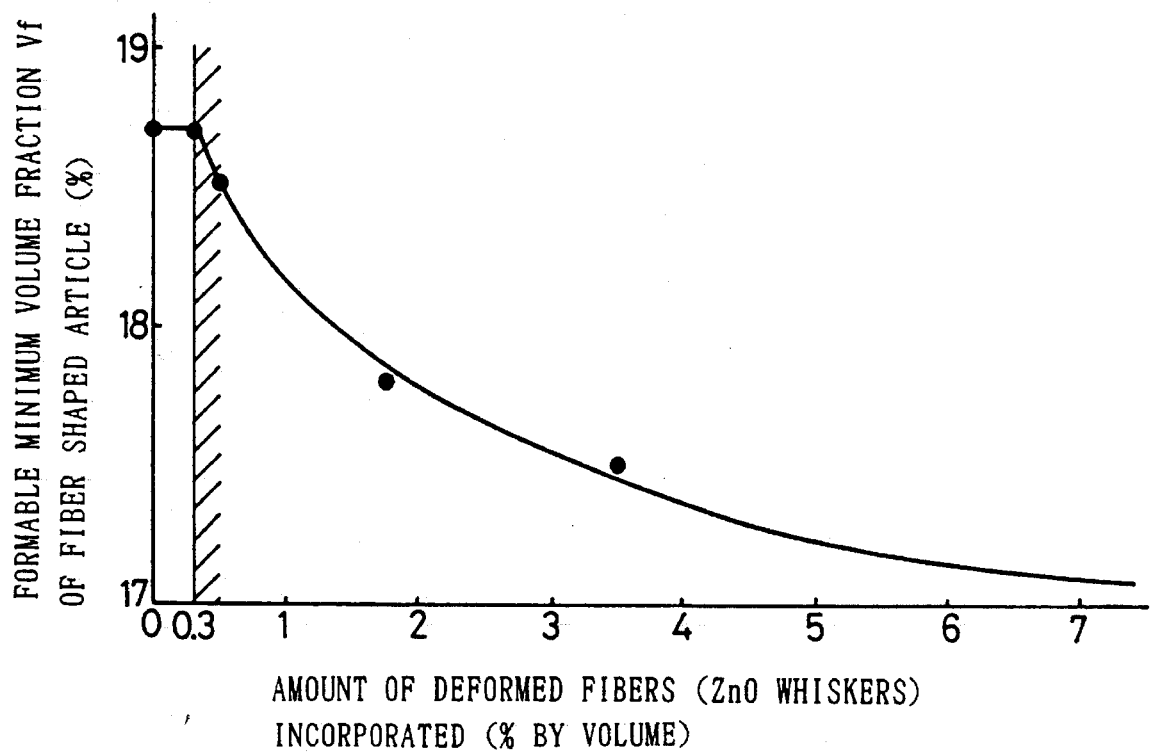
FIG. 10 is a graph illustrating the relationship between the amount of deformed fibers incorporated and the formable minimum volume fraction of the shaped-article.

FIG. 10 illustrates the relationship between the amount of deformed fibers 3 incorporated and the formable minimum volume fraction Vf of the shaped-article 1. The short fibers 2 used were aluminum borate whiskers ($9Al_2O_3$—$2B_2O_3$ whiskers) having a length L in the range of 10 to 20 µm and a diameter D in the range of 0.5 to 3 µm. The deformed fibers 3 used were zinc oxide whiskers of the type described above. As apparent from FIG. 10, with the amount of deformed fibers 3 incorporated being equal to or more than 0.3% by volume, it is possible to produce a shaped-article with a reduced minimum volume fraction Vf and thus having an increased thickness and a lower density.

Figure 11:
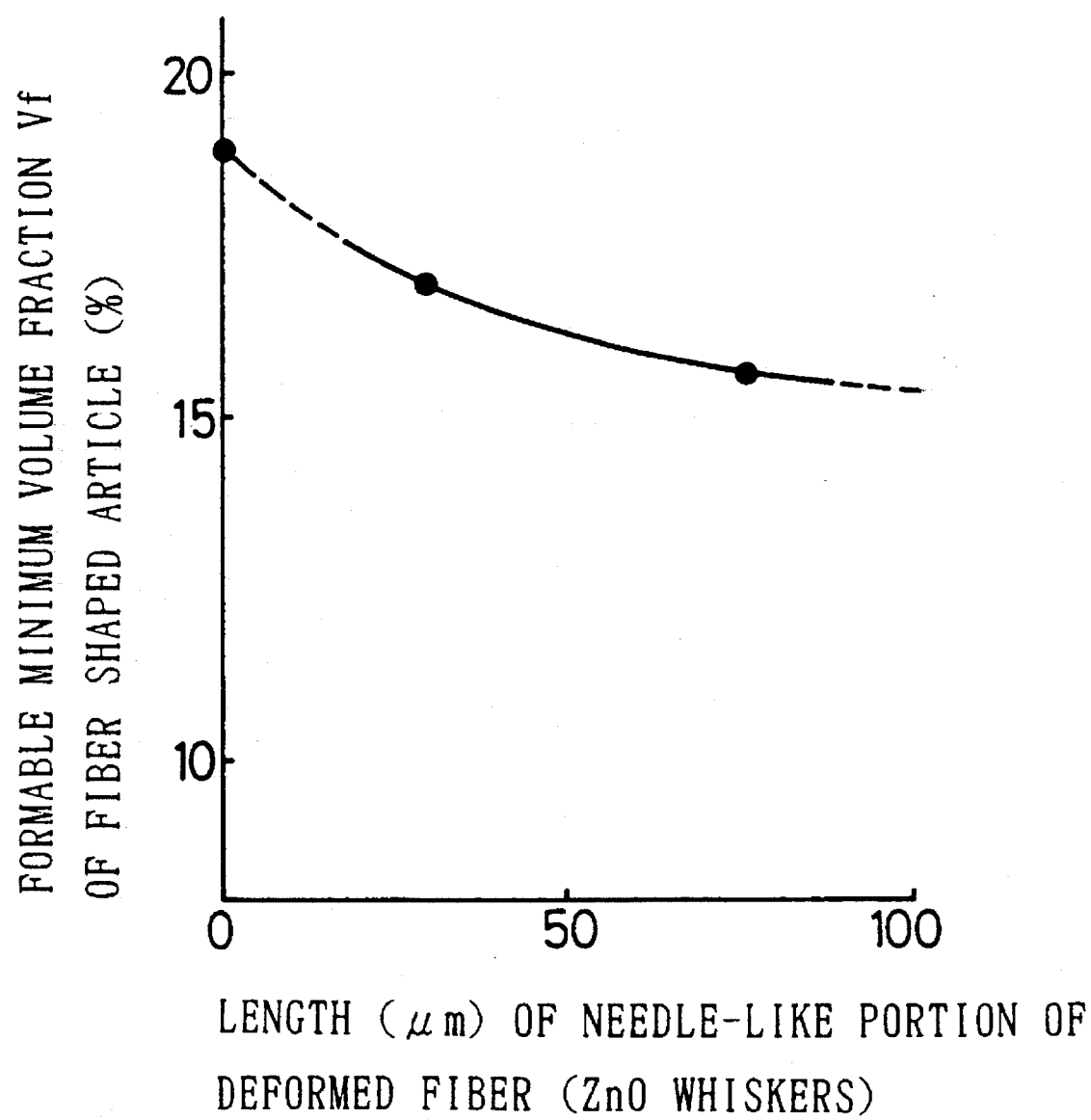
FIG. 11 is a graph illustrating the relationship between the length of the needle-like portion of the deformed fiber and the formable minimum volume fraction of the shaped-article.

FIG. 11 illustrates the relationship between the needle-like portion 5 of the deformed fiber 3 in the fiber shaped-article 1 and the formable minimum volume fraction Vf. The short fibers 2 and the deformed fibers 3 are the same as those in the example of FIG. 10. It can be seen from FIG. 11 that if the length of the needle-like portion 5 increases, the minimum volume fraction Vf is reduced.

Example 2

A shaped-article 1 was molded in the same manner as in Example 1, using the forming mold 6 employed in Example 1, and using aluminum borate whiskers ($9Al_2O_3$—$2B_2O_3$ whiskers) similar to those in Example 1 as short fibers 2 and zinc oxide whiskers (ZnO whiskers) similar to those in Example 1 as deformed fibers 3.

The conditions for producing the shaped-article 1 are as follows:

The size of the shaped-article 1: the diameter being 86 mm and the length being 25 mm;

The slurry-like forming material: water being in the amount of 1,000 cc, the fiber mixture being in the amount of 68 g, and the amount of deformed fibers 3 incorporated being 7% by volume;

The pressing force of the press piston: 30 kg/cm²; and

The suction pressure of the suction pump: 100 Torr.

The amount of deformed fibers 3 incorporated (% by volume) is represented by $(V_2/V_1) \times 100$ wherein $V_1$ represents the total volume of the fiber mixture (i.e., the sum of the volumes of the short fibers 2 and the deformed fibers 3), and $V_2$ represents the volume of the deformed fibers 3.

In the course of the above-described production, the crowding of the short fibers 2 is prevented by each of the needle-like portions 5 of the deformed fibers 3, when the fiber mixture is accumulated, so that the accumulated mass is maintained at a low density. Therefore, a large number of gaps for drainage can be ensured between the short fibers 2 within the accumulated mass, thereby shortening the liquid removing time to enhance the productivity of the shaped-article 1.

The deformed fiber 3, in some cases, may be folded at the needle-like portion 5 during handling and the like, but such a deformed fiber 3 still has a liquid removing-time shortening effect, if it has at least two needle-like portions 5. Such effect is enhanced, as the number of the needle-like portions 5 is increased.

In the shaped-article 1, the specific orientation of the short fibers 2 is broken by the deformed fibers 3 and, therefore, the short fibers 2 are dispersed at random in the entire shaped-article 1, and the deformed fibers 3 are dispersed substantially uniformly in an aggregation of the short fibers 2.

Figure 12:
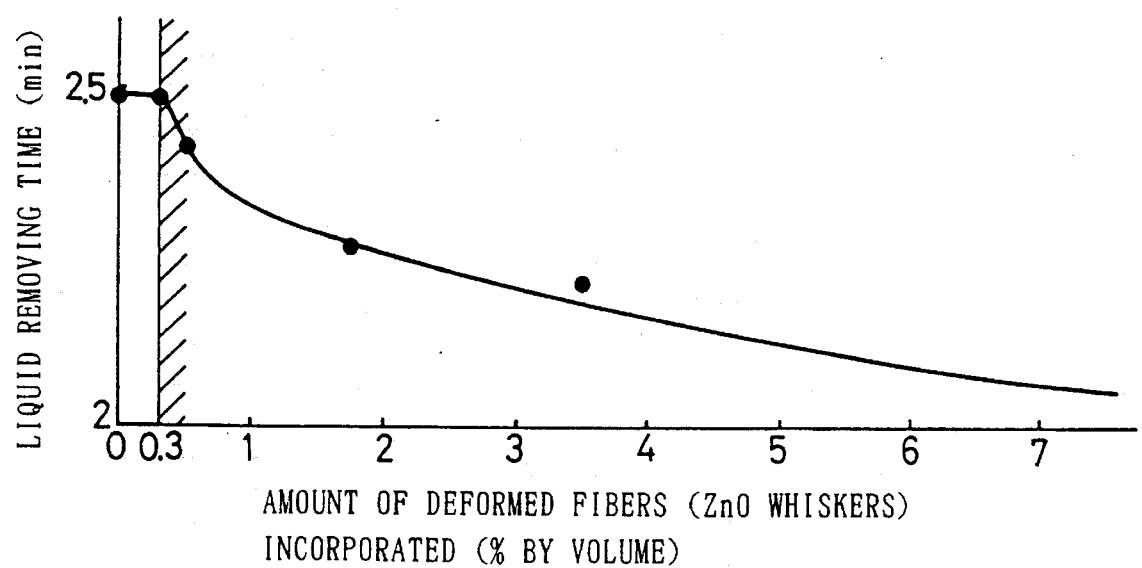
FIG. 12 is a graph illustrating the relationship between the amount of deformed fibers incorporated and the liquid removing time.

FIG. 12 illustrates the relationship between the amount of deformed fibers 3 and the liquid removing time. The liquid used is water in the amount of 1,000 cc, as in the above-described embodiment.

It is apparent from FIG. 12 that the liquid removing time can be shortened by incorporating the deformed fibers 3 in the amount of at least about 0.3% by volume. The preferred amount of deformed fibers 3 incorporated for providing such a time shortening effect is equal to or more than about 0.5% by volume. However, because the deformed fibers 3 principally have a reduced wear resistance as compared with the short fibers 2, if the amount of deformed fibers 3 incorporated exceeds about 55% by volume, it is feared that the wear resistance of the composite member may be degraded. From this viewpoint, the amount of deformed fibers 3 incorporated is preferred to be at most about 55% by volume.

It should be noted that as described in Example 1 and shown in FIG. 10 if the amount of deformed fibers 3 incorporated is set at a value equal to or more than about 3% by volume, it is possible to provide a shaped-article 1 with a reduced minimum volume fraction Vf, an increased thickness and a reduced density.

Example 3

A hybrid type shaped-article 1 was molded in the same manner as in the previous Example, using the forming mold 6 used in Example 1, and using, as short fibers 2, aluminum borate whiskers ($9Al_2O_3$—$2B_2O_3$ whiskers) having a relationship of L/D> 1. More specifically, the whiskers have a length L of 1 to 20 μm, a diameter D of 0.5 to 3 μm, and a specific gravity of 2.93. As deformed fibers 3, zinc oxide whiskers (ZnO whiskers) were used which have a tetrapod-like configuration having four needle-like portions 5 extending from a nucleus portion 4 and a specific gravity of 5.78.

The conditions for producing the hybrid type shaped-article 1 are as follows:

The size of the fiber shaped-article 1: the diameter being 86 mm and the length being 25 mm;

The slurry-like forming material: water being in the amount of 1,000 cc, the fiber mixture being in the amount of 68 g (the short fibers 2 being in the amount of 59.6 g and the deformed fibers 3 being in the amount of 8.4 g), and the amount of deformed fibers 3 incorporated being 7% by volume;

The pressing force of the press piston: 30 kg/cm$^2$;

The suction pressure of the suction pump: 100 Torr.; and

The drying: for 24 hours in cold air flow and for 12 hours in an atmosphere of 120° C.

The amount of deformed fibers incorporated (% by volume) is represented by $(V_2/V_1) \times 100$, wherein $V_1$ represents the total volume of the fiber mixture (i.e., the sum of the volumes of the short fibers 2 and the deformed fibers 3), and $V_2$ represents the volume of the deformed fibers 3.

In the course of the above-described production, when the fiber mixture is accumulated, the deformed fibers 3 of a high specific gravity is sedimented while holding the short fibers 2 of a low specific gravity by their needle-like portions 5, thus providing a hybrid type shaped-article with the deformed fibers 3 uniformly dispersed therein.

The deformed fibers 3, in some cases, may be folded at the needle-like portions 5 during handling and the like, but such a deformed fiber 3 still has an effect of holding the short fibers 2 therearound, if they have at least two needle-like portions 5. Such effect is improved, as the number of the needle-like portions 5 is increased.

In the hybrid-type shaped-article 1, the short 2 are dispersed at random over the entire fiber shaped-article 1, and the deformed fibers 3 are uniformly dispersed in the aggregation of the short fibers 2.

Figure 13:
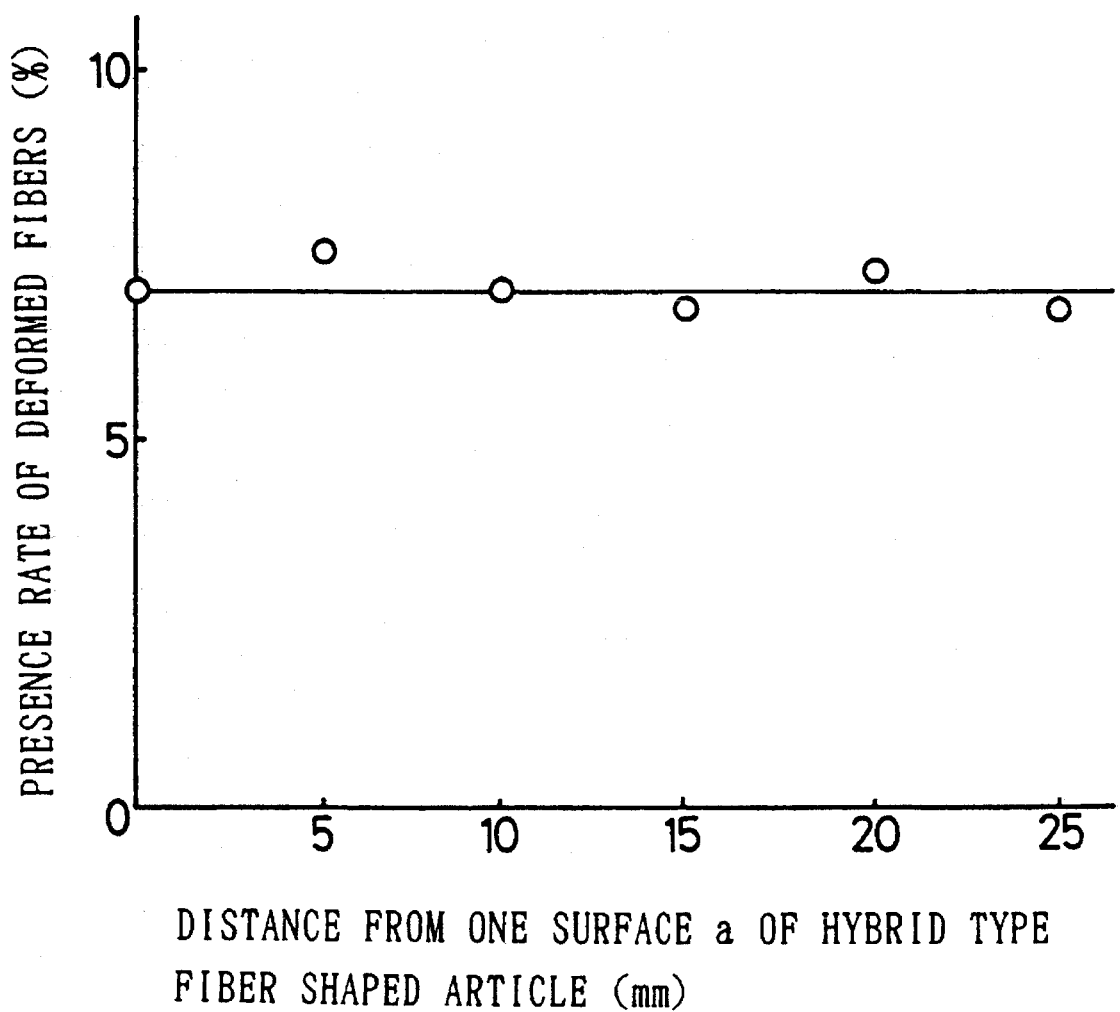
FIG. 13 is a graph illustrating the distance from the surface a of a hybrid type shaped-article and the presence rate of the deformed fibers.

FIG. 13 illustrates the relationship between the distance from one surface underscore (see FIGS. 2 and 4) on the bottom surface side of the cavity and the presence rate of the deformed fibers 3 in the hybrid-type shaped-article produced under the above-described producing conditions, i.e., the hybrid-type shaped-article 1 produced using the deformed fibers 3 in the amount of 7% by volume. It is apparent from FIG. 13 that by using the deformed fibers 3 as reinforcing fibers of a high specific gravity, the deformed fibers 3 are uniformly dispersed.

A fiber-reinforced composite member having a volume fraction Vf of the fiber shaped-article 1 of 14% and comprising a matrix forming material of an Al—Si—Cu—Mg based alloy was examined for the relationship between the amount of deformed fibers incorporated and the difference in strength between the directions A and B (see FIG. 1). The results made it clear that the difference in strength between the directions A and B could be reduced by setting the amount of deformed fibers 3 incorporated at least at about 0.3% by volume, thereby obtaining the moderate anisotropy in strength, as described with reference to FIGS. 7 and 8 in the Example 1. The preferred amount of deformed fibers 3 incorporated to provide such an effect is at least about 3% by volume. However, from the viewpoint that the wear resistance of the fiber-reinforced composite member may be improved, it is preferable that the amount of deformed fibers 3 incorporated is at most about 55% by volume.

We claim:

1. A shaped-article for use in producing a fiber-reinforced composite member, comprising inorganic short fibers and inorganic deformed fibers, wherein each of said deformed fibers have a nucleus portion and a plurality of needle-like portions extending integrally from said nucleus portion, said deformed fibers are dispersed throughout the shaped-article thereby disrupting the orientation of said short-fibers.

2. A shaped-article for use in producing a fiber-reinforced composite member according to claim 1, wherein the amount of deformed fibers incorporated is at least 3% by volume.

3. A shaped-article for use in producing a fiber-reinforced composite member according to claim 1 or 2, wherein said deformed fiber is a zinc oxide whisker.

4. A shaped-article for use in producing a fiber-reinforced composite member according to claim 1, 2 or 3, wherein the short fibers include whiskers of at least one selected from the group consisting of silicon carbide and aluminum borate.

5. A shaped-article for use in producing a fiber-reinforced composite member according to claim 3, wherein the short fibers include whiskers of at least one selected from the group consisting of silicon carbide and aluminum borate.

6. A shaped-article for use in producing a fiber-reinforced composite member according to claim 1, wherein the amount of deformed fibers incorporated is in the range of approximately 0.3% to 55% by volume.

* * * * *